UNITED STATES PATENT OFFICE.

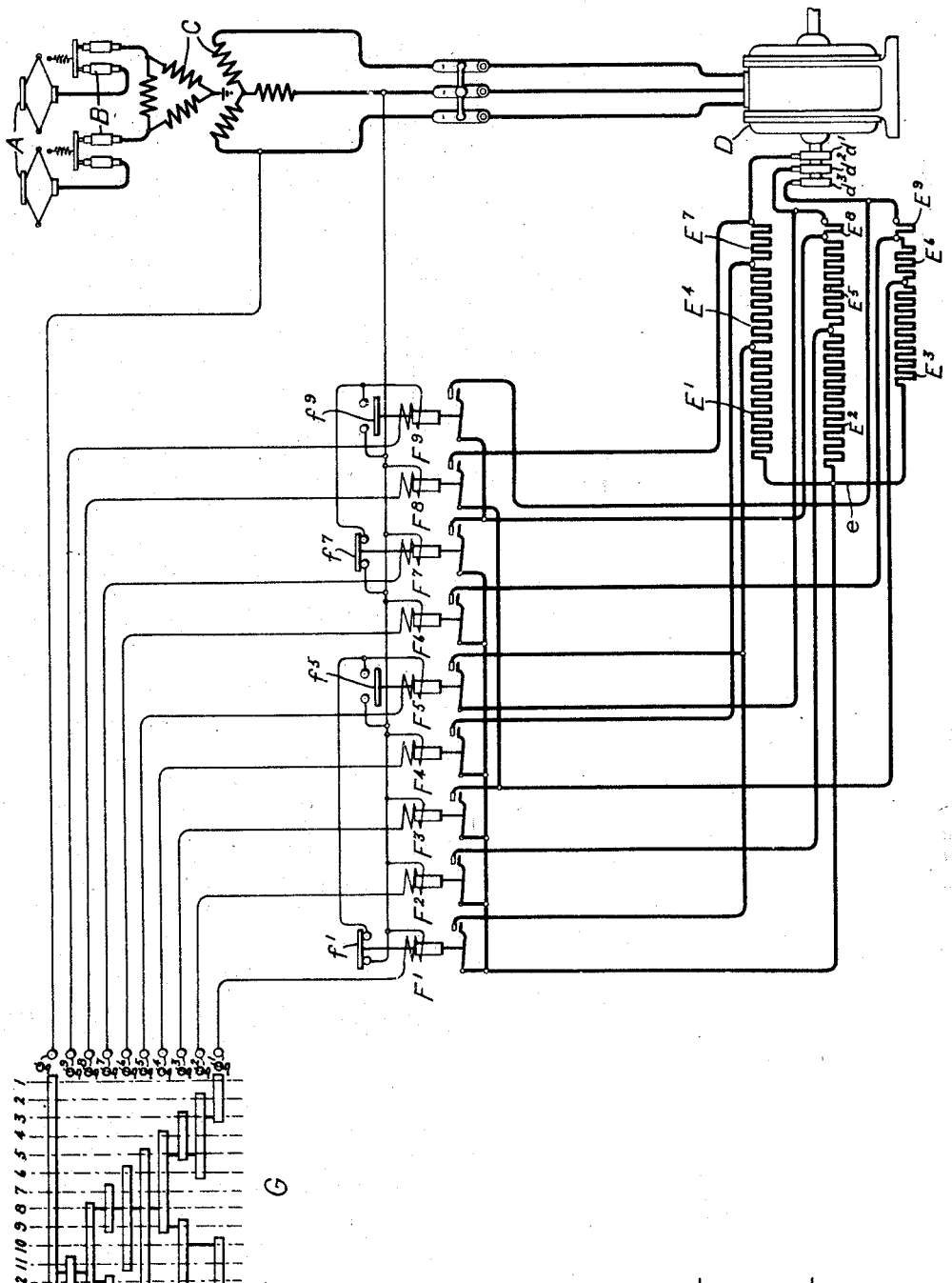

JOHN F. TRITLE, OF SCHENECTADY, NEW YORK, ASSIGNOR TO GENERAL ELECTRIC COMPANY, A CORPORATION OF NEW YORK.

MOTOR CONTROL.

980,707. Specification of Letters Patent. Patented Jan. 3, 1911.

Application filed July 15, 1908. Serial No. 443,612.

*To all whom it may concern:*

Be it known that I, JOHN F. TRITLE, a citizen of the United States, residing at Schenectady, county of Schenectady, State of New York, have invented certain new and useful Improvements in Motor Control, of which the following is a specification.

My invention relates to the control of electric motors by means of resistances. While, in its broader aspect, it is not limited to the control of induction motors, it is particularly applicable to motors of that type having resistances in circuit with the secondary, which are to be cut out step-by-step as the motor starts. It has been customary heretofore, in the control of such motors, to employ switches for successively short-circuiting portions of the resistances.

My invention consists in so arranging the short-circuiting switches that not only are certain portions directly short-circuited, but that other portions are connected in parallel with each other, before they are short-circuited. In this manner, with a given number of resistance sections and short-circuiting switches, I am enabled to obtain a greater number of resistance steps than were heretofore obtainable. For instance, in the case of a three-phase arrangement of resistances connected in Y, after short-circuiting a portion of the resistances for one phase, I may establish a connection from another phase to an intermediate point on the short-circuited portion, thereby connecting two sections of the short-circuited portion of one phase in parallel with each other and in series with respect to the other phase.

My invention will best be understood by reference to the accompanying drawing, which shows diagrammatically a motor-control system arranged in accordance with my invention.

The drawing shows diagrammatically a motor-control system adapted for the control of polyphase induction motors on a car or vehicle.

A represents the current-collectors or trolleys, which are shown as of the bow-trolley type.

B represents the main switches in series with the primary windings of the step-down transformer C, to the secondaries of which the motor or motors D are connected.

$E^1$ to $E^9$, inclusive, represent resistances connected in circuit with the secondary of the motor D through collector rings $d^1$, $d^2$ and $d^3$. The connection of the resistances shown is the three-phase Y-connection, comprising three groups of resistances,—one in each phase; the groups having a common terminal $e$, and each group, in the particular case shown, comprising three resistance sections.

$F^1$ to $F^9$, inclusive, represent electromagnetically-actuated switches for short-circuiting the resistances step-by-step to control the motors. Certain of these switches are provided with interlocking contacts $f^1$, $f^5$, $f^7$ and $f^9$, as shown.

G represents a master controller controlling the circuit of the actuating windings of the short-circuiting switches. This controller is shown diagrammatically, with its contacts developed on a plane surface. It comprises ten stationary contact-fingers $g$ to $g^9$, the fingers $g^1$ to $g^9$ being numbered to correspond to the electromagnetically-actuated switches or contactors which they control. The movable portion of the switch is arranged for twelve positions indicated by the dotted lines 1 to 12.

At starting the switch G is in the off position, as shown, so that when the primary circuit of the motor D is closed, the motor starts with all the resistance in its secondary circuit. When switch G is moved to its first operative position, contact-fingers $g$ and $g^1$ are connected to each other, thereby energizing contactor $F^1$. This contactor short-circuits the resistance $E^1$. In its second position, switch G energizes contactor $F^2$, which short-circuits resistance $E^2$. In its third position, switch G energizes contactor $F^3$, which short-circuits resistance $E^3$. When switch G is moved to its fourth position, contactor $F^4$ is energized, short-circuiting resistance $E^4$, as well as resistance $E^1$, and contactor $F^1$ is deënergized. Up to this point, the arrangement of short-circuiting switches is that ordinarily employed. When switch G is moved to its fifth position, however, a novel connection is established. If contactor $F^1$ has fallen, contactor $F^5$ is energized. The actuating circuit of this contactor is run through interlocking contact $f^1$ on contactor $F^1$, so as to prevent the energization of contactor $F^5$, until contactor $F^1$ has fallen. Contactor $F^5$ is provided with the contact $f^5$, so that when it is once energized, it remains energized, regardless of contactor $F^1$. The closing of contactor $F^5$ establishes a connection from collector ring $d^2$ to the junction of resistances $E^1$ and $E^4$. These resistances $E^1$ and $E^4$ are short-circuited in series by the contactor $F^4$, but the connection established by the contactor $F^5$ throws these two resistance sections $E^1$ and $E^4$ into parallel with each other and into series with the phase of the motor secondary to which collector ring $d^2$ is connected. In other words, while the circuit from collector ring $d^1$ to the common terminal $e$ of the resistances passes through resistance $E^7$ and contacts of contactor $F^4$, the circuit from the collector ring $d^2$ passes through the contacts of contactor $F^5$, and then through resistance sections $E^1$ and $E^4$, in parallel. Furthermore, there is another path from collector ring $d^2$ to common resistance terminal $e$, through resistance sections $E^8$ and $E^5$ and contactor $F^2$. Resistance sections $E^8$ and $E^5$ in series are thus thrown in parallel with resistance sections $E^1$ and $E^4$, in the circuit of collector ring $d^2$. When switch G is moved from position 5 to position 6, contactor $F^6$ is energized, short-circuiting both resistance sections $E^6$ and $E^3$, and contactor $F^3$ is then deënergized. Passing to position 7, contactor $F^7$ is energized, short-circuiting resistances $E^5$ and $E^2$, while contactor $F^2$ is deënergized. This cuts resistance section $E^5$ out of circuit, and places resistance $E^8$ alone in parallel with resistances $E^1$ and $E^4$. In passing to position 8, switch G energizes contactor $F^8$, which establishes a connection from collector ring $d^1$ to the junction of resistances $E^3$ and $E^6$. This places three resistances in parallel between collector ring $d^1$ and common resistance terminal $e$. The path of these three resistances may be traced as follows: from collector ring $d^1$, through resistance $E^7$ and contactor $F^4$ to terminal $e$, and from collector ring $d^1$, through contactor $F^8$, and thence dividing, part passing through resistance $E^3$, directly to terminal $e$, and the other through resistance $E^6$ and contactor $F^6$ to terminal $e$. In passing from position 8 to position 9, switch G again energizes contactor $F^3$, which short-circuits resistance $E^3$, and consequently connects collector ring $d^1$ directly to terminal $e$. This circuit may be traced from collector ring $d^1$, through contactors $F^8$ and $F^3$. When switch G is moved from position 9 to position 10, collector ring $d^2$ is connected directly to common terminal $e$, since contactor $F^1$ is again energized, so that a circuit may be traced from collector ring $d^2$, through contactors $F^5$ and $F^1$ in series to common terminal $e$. Contactors $F^7$ and $F^4$ being no longer required, are now deënergized. In moving from position 10 to position 11, contactor $F^9$ is energized, provided contactor $F^7$ has fallen, these two contactors being provided with interlocking contacts, like those for contactors $F^1$ and $F^5$. The closing of contactor $F^9$ connects collector ring $d^3$ to the junction of resistances $E^5$ and $E^8$, and thereby establishes parallel circuits from collector ring $d^3$ to common terminal $e$. One of these circuits passes from collector ring $d^3$, through resistance $E^9$ and contactor $F^6$. Another circuit passes from collector ring $d^3$, through contactor $F^9$, to the junction of resistances $E^5$ and $E^8$. Here the circuit divides, one side passing through resistance $E^8$ and contactors $F^5$ and $F^1$ in series, while the other passes through resistances $E^5$ and $E^2$ in series. In passing from position 11 to position 12 of switch G, contactor $F^7$ is again energized, thereby establishing a direct connection from collector ring $d^3$, through contactors $F^9$ and $F^7$ in series, to terminal $e$. Contactor $F^6$ being no longer required is deënergized.

With the arrangement of switches above described, twelve different resistance conditions are obtained, in addition to the starting condition with all resistances in series, and these twelve steps are obtained with nine resistance sections and nine contactors, which, in the ordinary arrangement, would give only nine resistance steps. It will, of course, be understood that the principle of control, above described, may be further extended. In order to get the proper gradations of resistance, the several resistance sections should be properly proportioned. The diagram roughly indicates suitable portions of the resistances for the particular control shown.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with an induction motor, a three-phase arrangement of resistances connected in Y in series with the secondary of said motor, and switches arranged to short-circuit portions of the resistance for each phase and to establish a connection from one phase to an intermediate point of the resistance for a different phase, whereby certain portions of said resistances are connected in parallel before they are short-circuited.

2. In combination with an induction motor, a three-phase arrangement of resistances connected in Y in series with the secondary of said motor, and switches arranged to short-circuit portions of the resistance for each phase and to establish a connection from one phase to an intermediate point on a short-circuited portion of the resistance for another phase whereby two sections of said short-circuited portion are connected in parallel with each other in series with the first phase.

3. In combination with an electric motor, a plurality of resistances in circuit therewith having a common terminal, and switches arranged to short-circuit portions of said resistances and to establish a connection from one resistance to an intermediate point on another resistance whereby certain portions of said resistances are connected in parallel before they are short-circuited.

4. In combination with an electric motor, a plurality of resistances in circuit therewith having a common terminal, and switches arranged to short-circuit portions of said resistances and to establish a connection from one resistance to an intermediate point on a short-circuited portion of another resistance whereby two sections of said short-circuited portion are connected in parallel with each other and in series with respect to said connection.

5. In combination with an electric motor, resistances in circuit with said motor, electromagnetically-actuated switches arranged to short-circuit portions of said resistances and to connect certain portions in parallel with other portions before short-circuiting them, and a control system controlling the circuits of the actuating windings of said switches.

6. In combination with an electric motor, resistances in circuit with said motor, electromagnetically-actuated switches arranged to short-circuit portions of said resistances and to establish a plurality of parallel connections between certain portions of said resistances before short-circuiting them, and a control system controlling the circuits of the actuating windings of said switches.

7. In combination with an electric motor, a plurality of resistances in circuit therewith having a common terminal, electromagnetically-actuated switches arranged to short-circuit portions of said resistances and to establish a connection from one resistance to an intermediate point on another resistance whereby certain portions of said resistances are connected in parallel before they are short-circuited, and a control system controlling the circuits of the actuating windings of said switches.

8. In combination with an induction motor, a three-phase arrangement of resistances connected in Y in series with the secondary of said motor, electromagnetically-actuated switches arranged to short-circuit portions of the resistance for each phase and to establish a connection from one phase to an intermediate point on a short-circuited portion of the resistance for another phase whereby two sections of said short-circuited portion are connected in parallel with each other in series with the first phase, and a control system controlling the circuits of the actuating windings of said switches.

In witness whereof, I have hereunto set my hand this 8th day of July, 1908.

JOHN F. TRITLE.

Witnesses:
 HELEN ORFORD,
 FRANK J. DORE.